(12) United States Patent
Zhang et al.

(10) Patent No.: US 6,519,449 B1
(45) Date of Patent: Feb. 11, 2003

(54) METHOD AND APPARATUS FOR A SIGNAL POWER CONTROL IN A WIRELESS COMMUNICATION SYSTEM

(75) Inventors: Genzao G. Zhang, Vanier (CA); Kuang-Tsan Wu, Kanata (CA); Jiandong Zhuang, Nepean (CA); Pei Hou, Nepean (CA); Shiwei Gao, Nepean (CA); Harvey H. Lee, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/428,988

(22) Filed: Oct. 29, 1999

(51) Int. Cl.[7] .............................. H04B 1/00; H04B 1/40; H04B 1/38; H04B 7/212; H04Q 7/20
(52) U.S. Cl. .............................. 455/69; 455/68; 455/88; 455/522; 455/561; 370/324; 370/337; 370/347
(58) Field of Search .......................... 455/69, 522, 561; 375/130, 297; 370/324, 325, 320, 347, 337, 321

(56) References Cited

U.S. PATENT DOCUMENTS

| | | | | |
|---|---|---|---|---|
| 5,412,686 A | * | 5/1995 | Ling | 375/200 |
| 5,542,111 A | * | 7/1996 | Ivanov et al. | 455/126 |
| 5,669,066 A | * | 9/1997 | Borg et al. | 455/69 |
| 6,127,975 A | * | 10/2000 | Maloney | 342/457 |

* cited by examiner

Primary Examiner—Edward F. Urban
Assistant Examiner—Meless Zewdu

(57) ABSTRACT

The invention provides a signal power control method and apparatus for a wireless system to control the power level of a received signal transmitted over a radio link so as to counteract transmission impairments caused by environment variations and maintain the reliability of the radio link. The signal power control of this invention serves to control the transmit power used for transmission and adjust the position of the receiver dynamic range so that the received signal can always be optimally received. In a preferred embodiment, the invention is incorporated in a broadband wireless access (BWA) time division multiplex access (TDMA) system to maintain the reliability of an upstream radio link connecting a base transceiver station (BTS) with multiple customer premises equipment (CPE) units. In the preferred embodiment, power control messages are exchanged between the BTS and the CPE units based on the international telecommunications union (ITU) R112 local multipoint distribution service (LMSD) standard for effecting the signal power control of the present invention.

39 Claims, 9 Drawing Sheets

METHOD AND APPARATUS FOR A SIGNAL POWER CONTROL IN A WIRELESS COMMUNICATION SYSTEM

FIELD OF THE INVENTION

The present invention relates to digital wireless communications systems and more particularly, to a method and apparatus for a signal power control in such systems.

BACKGROUND OF THE INVENTION

Over the past few years, various wireless architectures have been developed in response to user demands for systems which can offer high-rate data communications. Recently for example, broadband wireless access (BWA) systems have become of interest to the wireless industry for their ability to supply high speed multimedia data services.

In a wireless communication system such as a BWA network, it is common to speak of a point-to-multipoint architecture in which a base transceiver station (BTS) is positioned at the center of a service area (normally called a cell) and communicates over the air with multiple customer premises equipment (CPE) units located within the same cell. The BTS is usually fixed and designed with a single receiver for servicing all of the CPE units present in the cell. The CPE units can be designed to have fixed locations within the cell or alternatively be portable and free to roam.

Typically, the direction of communication from the BTS to the CPE units is called the downstream direction and the reverse direction of communication is referred to as the upstream direction. In order to send separate downstream data streams to multiple CPE units at the same time, the data is usually multiplexed. There is presently various multiplexing methods used for downstream communications. For example, downstream data is often transmitted by frequency division multiple access (FDMA) by assigning a distinct downstream carrier frequency to each CPE unit.

More commonly however, downstream data destined for several CPE units is multiplexed in time and is transmitted at a common forward carrier frequency. This can also apply to upstream communications with upstream data originating from several CPE units multiplexed in time and transmitted at another common carrier frequency. A cellular system that has these characteristics is usually referred to as a time-division multiple access (TDMA) system.

In order to multiplex several data streams into a single TDMA stream, the time structure of a communications link is divided into scheduling periods having a fixed number of time slots per scheduling period. The CPE units can only access the upstream link if an opportunity is granted in a scheduling period by the BTS. When an opportunity is given to a particular CPE unit to transmit on the upstream link, the CPE unit initially notifies the BTS of the amount of upstream bandwidth it requires for its transmission. This bandwidth on-demand process causes upstream transmissions to occur in bursts.

The upstream and downstream data is typically transmitted in dedicated frequency channels also referred to as radio links. Because radio link transmissions are carried over air, channel conditions associated with radio links are much worse than those related to physical wires. Transmission impairments such as variable propagation path loss, impulse noise, fading, interference and most notably rain attenuation often occur as a result of environmental variations to corrupt and attenuate transmitted signals. These impairments dramatically reduce transmission reliability and in some situations may even cause link failures. As a result, the maintenance of reliable radio links is extremely important for a wireless system.

A key aspect in maintaining a reliable radio link between CPE units and a BTS in a wireless system is the ability to counteract signal power variations caused by transmission impairments. At the BTS, an automatic gain control (AGC) circuit will generally be used in the BTS receiver to adjust the signal power received and compensate for variations caused by transmission impairments so that signals can be received at the BTS at a relatively constant power level. In a point-to-multipoint TDMA system, the BTS receiver AGC must be designed to operate rapidly and on a burst-by-burst basis to efficiently service all of the CPE units present in the cell.

However, conventional AGCs are not well suited for high-frequency signals transmitted in bursts such as upstream radio signals transmitted from CPE units to a BTS. In current systems, these burst signals typically operate at high symbol rates in excess of 5 Megabauds with bursts of varying sizes and separated by idle periods of varying durations. Conventional AGCs are not suited for such high-frequency and bursty transmissions from different CPE units and would not be able to react quickly and adequately to counteract power variations in each signal burst received. Therefore, it would be desirable to provide a burst-to-burst signal power compensation scheme at the BTS to efficiently service all of the CPE units present in a cell.

It would also be desirable to have a large BTS receiver dynamic range to counteract wide power variations in the signals received from the CPE units. These variations are common in wireless because radio signals are often seriously impaired or corrupted during transmission as a result of changes in the environment such as, for example, rainfalls. A large BTS receiver dynamic range is also desirable to address the well-known near-far design issue which arises as a result of large variations in propagation path loss caused by user mobility and changing distances between the CPE units and the BTS.

However, conventional AGCs are not currently designed with a sufficiently large dynamic range and cannot counteract wide power variations in the signals received from the CPE units. Designing an AGC with a dynamic range large enough to accommodate transmissions from the CPE units would be prohibitively expensive and unnecessarily complex.

To alleviate some of the shortcomings of conventional AGCs, it is known to use a transmit signal power control at each CPE unit. With this technique, an optimal (desired) receive signal power level is set near the middle of the BTS receiver dynamic range. When the power of a received signal varies away from the optimal level, the BTS instructs each CPE unit to adjust its transmit power such that the signal power received at the BTS can be maintained at the optimal level.

Presently, transmit power controls are used in various communications systems to help reduce the impact of transmission impairments and improve link reliability. Unfortunately, for a radio signal transmitted from a CPE unit to a BTS which is impaired or corrupted by changing environmental conditions, the signal power received at the BTS may fall outside the BTS receiver dynamic range well before the CPE transmit power can be adjusted to compensate. This is particularly true of radio signals transmitted at high frequencies which are more likely to suffer from environmental variations than low frequency signals.

Thus, there is a need to provide a signal power control for wireless systems to counteract transmission impairments affecting radio signals transmitted and maintain reliable radio link connectivity.

SUMMARY OF THE INVENTION

The present invention addresses these issues and to this end provides a methodology and apparatus to mitigate the present limitations in this art.

The invention provides a signal power control method and apparatus for efficiently controlling in a wireless system the power level of a received signal transmitted over a radio link so as to counteract transmission impairments caused by environment variations and maintain the reliability of the radio link. In order to efficiently and rapidly control the signal power of a received radio signal, the signal power control of this invention serves to control the transmit power used for transmission and adjust the position of the receiver dynamic range so that the received signal can always be optimally received.

In a preferred embodiment, the invention is incorporated in a broadband wireless access (BWA) time division multiplex access (TDMA) system to maintain the reliability of an upstream radio link connecting a base transceiver station (BTS) with multiple customer premises equipment (CPE) units. In the preferred embodiment, the signal power of upstream signals received at the BTS is controlled with two power control loops. A first control loop is used for adjusting the transmit power at each CPE unit and a second control loop is used to adjust the position of the BTS receiver dynamic range so that the upstream burst signals can all be received.

According to the invention, each control loop relies on a communication protocol such as the international telecommunications union (ITU) R112 local multipoint distribution service (LMSD) standard as a means to exchange power control messages between the BTS and the CPE units.

Advantageously, with the CPE transmit control loop and the BTS receiver range control loop, the invention can effectively counteract impairments brought about by environmental changes which may afflict upstream signals during transmission. By compensating for transmission impairments, the upstream connectivity between the BTS and each CPE unit can be reliably maintained.

With the combined control of the CPE transmit power and the BTS receiver dynamic range, the invention can also be advantageously used for providing power control in wireless systems where receivers exhibit a narrow receive power dynamic range.

Yet another advantage of using a CPE transmit control loop and a BTS receiver range control loop is that the received power of signals operating at high frequency and in bursts such as upstream signals in a BWA TDMA system can be efficiently controlled.

BRIEF DESCRIPTION OF THE DRAWINGS

These and other aspects and features of the present invention will become apparent to those of ordinary skill in the art upon review of the following description of specific embodiments of the invention in conjunction with the accompanying drawings, in which.

DETAILED DESCRIPTION OF THE PREFERRED EMBODIMENTS

The invention provides a signal power control method and apparatus for efficiently controlling in a wireless system the power level of a received signal transmitted over a radio link so as to counteract transmission impairments caused by environment variations and maintain the reliability of the radio link. In order to efficiently and rapidly control the signal power of a received radio signal, the signal power control of this invention serves to control the transmit power used for transmission and adjust the position of the receiver dynamic range so that the received signal can be optimally received.

In a preferred embodiment, the invention is incorporated in a broadband wireless access (.BWA) time-division multiple access (TDMA) network to provide a fast and efficient power control for upstream transmissions between a base transceiver station (BTS) and multiple customer premises equipment (CPE) units.

Figure 1:
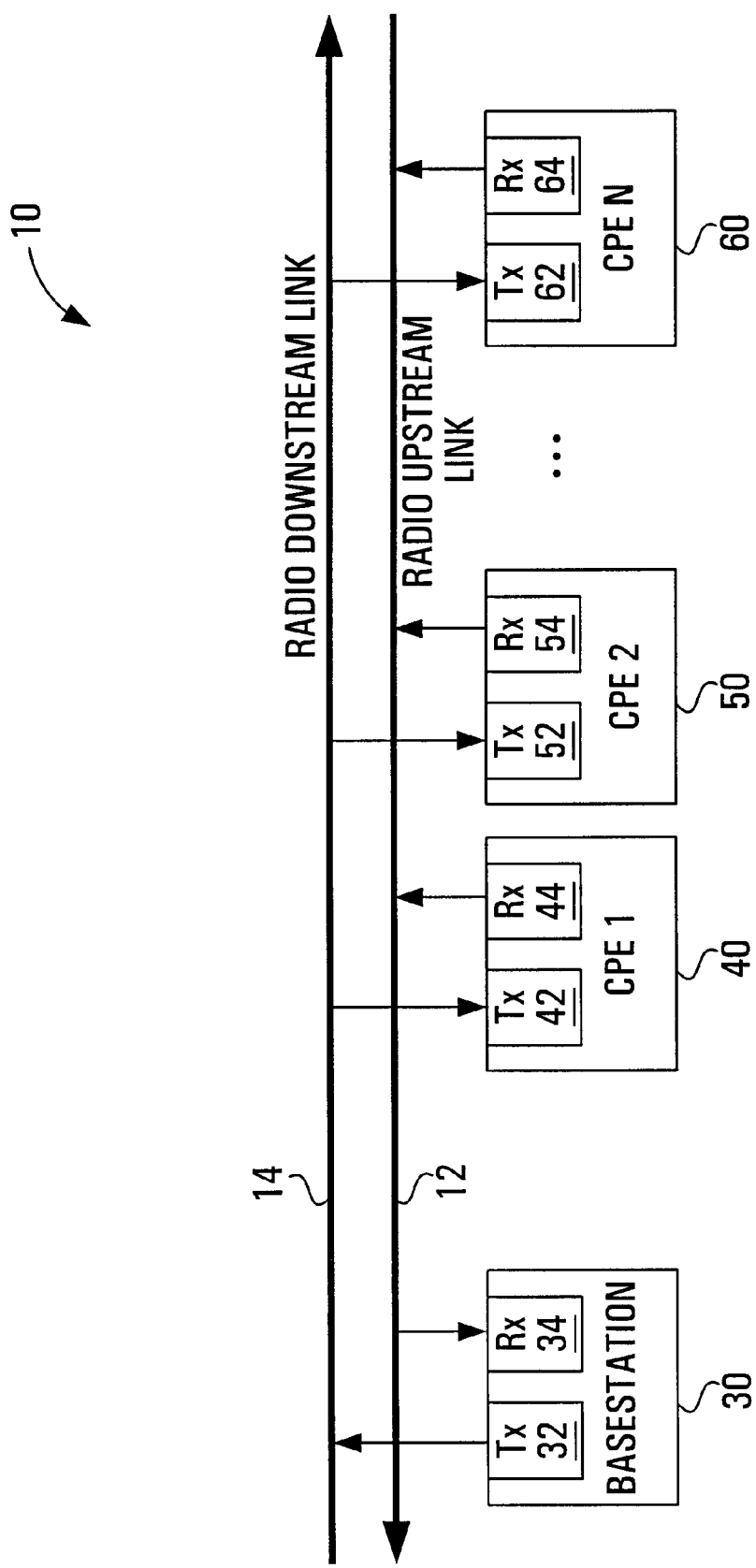
FIG. 1 is a block diagram of a typical broadband wireless access (BWA) time-division multiple access (TDMA) network featuring a base transceiver station (BTS) and multiple customer premises equipment (CPE) units.

Referring firstly to FIG. 1, there is illustrated a block diagram of a BWA TDMA network generally indicated by 10 which consists of a BTS 30 connected to a plurality N of CPE units 40, 50, 60 (only three shown) via an upstream radio frequency link 12 and a downstream radio link 14. For downstream communications, the BTS 30 has a transmitter 32 operable to transmit downstream data over the downstream radio link 14 and each of the CPE units 40, 50, 60 has a respective receiver 44, 54, 64 tuned to receive the downstream data transmitted by the BTS 30. Similarly, for upstream communications, the CPE units 40, 50, 60 have a respective transmitter 42, 52, 62 operable to transmit upstream data over the upstream radio link 12 and the BTS 30 has a receiver 34 of a defined dynamic range which can receive the upstream data transmitted from the CPE units 40, 50, 60.

In order to establish and maintain upstream communications over the upstream radio link 12, each particular CPE unit 40, 50, 60 must be synchronized with the BTS 30. For this, the BWA TDMA network 10 uses a communication protocol which defines a synchronization or ranging process by which a CPE unit 40, 50, 60 can initially and periodically thereafter synchronize itself with the BTS 30 for upstream communications.

As part of the ranging process, the signal power received at the BTS 30 for each upstream signal transmitted by the CPE units 40, 50, 60 is closely controlled to counteract transmission impairments and maintain the upstream link 12 reliable. In order to maintain the upstream link 12 operational, the signal power of each upstream signal received at the BTS 30 must be maintained within the BTS receiver dynamic range. For this, the invention provides a transmit power control to adjust the transmit power used at each CPE unit 40, 50, 60 and a receiver range control to shift the position of the BTS receiver dynamic range to a location where all the upstream signals can be received.

With the transmit control, the BTS 30 can rapidly and efficiently adjust the power of each received upstream signal on an individual basis. In this way, the received power of an upstream signal impaired or attenuated more than other upstream signals can be independently compensated without altering the signal power received on the other upstream signals which may not be impaired or attenuated to the same extent.

The BTS 30 controls the transmit power used at each CPE unit 40, 50, 60 by way of a transmitter (Tx) power control loop. When the power of an upstream signal received from a particular CPE unit 40, 50, 60 varies away from an optimal level within the BTS receiver dynamic range, the BTS receiver instructs the transmitting CPE unit 40, 50, 60 to adjust its transmit power such that the signal power received at the BTS receiver can be maintained at the optimal level. This transmit power control provides short-term adjustment of the upstream signal power receiver at the BTS 30.

With the receiver range control, the BTS 30 can shift the BTS receiver dynamic range. According to the invention, the dynamic range limitation of the BTS receiver is used as a window that can be moved within the total range of the receiver to ensure that all the upstream signals can be received within the BTS receiver dynamic range. Similarly to the transmit power control, the BTS receiver dynamic range control is also performed by way of a receiver (Rx) range control loop at the BTS 30.

The BTS receiver range control is particularly useful in situations where all of the upstream signals are subject to the same transmission impairments such as for example, a rainfall over the cell in which the BWA TDMA network 10 is located. In these situations, all of the upstream signals would be subject to similar transmission impairments and be relatively impaired or attenuated at the same rate. The upstream signals can be collectively compensated by the BTS 30 which can shift the BTS receiver dynamic range to a position where all of the upstream signals can be received. This BTS receiver dynamic range control can be viewed as a long-term power control.

In order to implement the transmit power control and receiver range adjustment mechanism described above, the BTS 30 relies on the existing communication protocol used in the BWA TDMA network 10 to exchange power control messages with the CPE units 40, 50, 60. There are various communication protocols which can provide the necessary flexibility to permit the exchange of power control messages between the BTS 30 and the CPE units 40, 50, 60 including for example, the international telecommunications union (ITU) R112 local multipoint distribution service (LMSD) protocol (hereinafter the "R112 protocol"). For simplicity, it is hereinafter assumed that the invention is implemented using the R112 protocol. However, it is to be understood that other communication protocols could also be used according to the invention.

The architecture and functionality necessary in the BTS 30 and each of the CPE units 40, 50, 60 to implement the transmit power control and receiver range adjustment mechanism will now be described below in further detail. To begin, the manner in which the CPE units 40, 50, 60 are synchronized to the BTS 30 according to the R112 protocol is detailed as this is required for an understanding of the manner in which the transmit power control and receiver range adjustment mechanism are implemented.

In order to establish and maintain upstream communications over the upstream radio link 12, each particular CPE unit 40, 50, 60 must be synchronized with the BTS 30. For this, the BWA TDMA network 10 uses the R112 communication protocol which defines a synchronization (ranging) process by which a new CPE unit 40, 50, 60 can initially and continuously thereafter synchronize itself with the BTS 30 for upstream communications.

Figure 2:
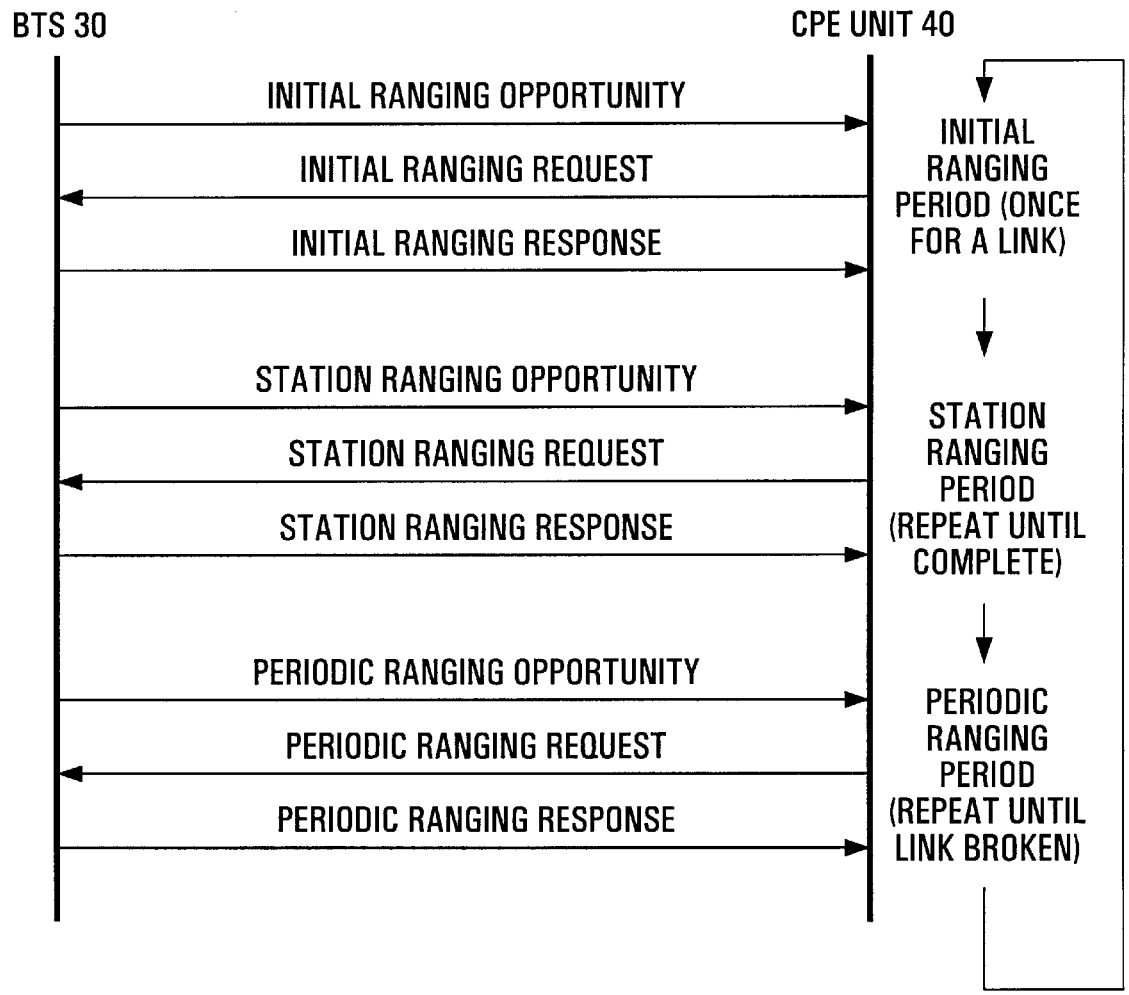
FIG. 2 is a diagram illustrating an international telecommunications union (ITU) R112 local multipoint distribution service (LMSD) protocol (hereinafter the "R112 protocol") ranging process used in the BWA TDMA network of FIG. 1.

According to the R112 protocol, the BTS 30 runs periodical checks to see if there is any new CPE unit 40, 50, 60 which has been powered up and is about to join the BWA TDMA network 10. For this, the BTS provides ranging opportunities for new CPE units 40, 50, 60, to join the BWA TDMA network 10. When the BTS 30 receives an initial ranging request from a new CPE unit 40, 50, 60, the BTS 30 initiates a ranging process to synchronize the new PCE unit 40, 50, 60 with the BTS 30. FIG. 2 illustrates a R112 ranging process in detail. The ranging process shown in this figure consists of an initial ranging procedure, a station ranging procedure and a periodic ranging procedure. In each procedure, messages are exchanged between the new CPE unit 40, 50, 60 and the BTS 30 to carry out the synchronization.

The initial ranging procedure is initiated as the BTS receives an initial ranging request from a new CPE unit 40, 50, 60. At this point, the BTS 30 invites the new CPE unit 40, 50, 60 for an initial station maintenance. During this initial station maintenance, the BTS 30 requests the new CPE unit 40, 50, 60 to nominally adjust its local timing base, upstream carrier frequency and upstream transmit power for TDMA operations over the upstream radio link 14.

For this, three messages are exchanged. First, the BTS 30 transmits an initial ranging opportunity message to the new CPE unit 40, 50, 60 to schedule an initial maintenance period on the upstream radio link 12. Upon receiving the initial ranging opportunity message, the new CPE unit 40, 50, 60 transmits an initial ranging request message to the BTS 30. At the BTS 30, the initial ranging request message received from the new CPE unit 40, 50, 60 is used to measure and estimate nominal timing, frequency and power offsets for the new CPE unit 40, 50, 60. The offsets calculated are transmitted to the new CPE unit 40, 50, 60 in the form of an initial ranging response message. In the new CPE unit 40, 50, 60, the offsets received are applied so that the new CPE unit 40, 50, 60 can be nominally synchronized to the BTS 30.

After this initial station maintenance, the BTS 30 enters into the station ranging procedure to further adjust the CPE local timing base, upstream carrier frequency and transmit power. Similarly to the initial station maintenance, three messages are also exchanged during the course of this ranging procedure. First, the BTS 30 transmits a station ranging opportunity message to the new CPE unit 40, 50, 60 to schedule a station maintenance period. Upon receiving the station ranging opportunity message, the new CPE unit 40, 50, 60 transmits a station ranging request message to the BTS 30. Similarly, at the BTS 30, the station ranging request message is used to measure and estimate the CPE local timing base, upstream carrier frequency and upstream transmit power offsets. The adjustments are transmitted to the new CPE unit 40, 50, 60 in the form of a station ranging response message and applied therein to better synchronize the new CPE unit 40, 50, 60 to the BTS 30. The station ranging procedure is a fine adjustment procedure and may be repeated many times if necessary.

Once the new CPE unit 40, 50, 60 has been completely synchronized with the BTS 30, it can begin to exchange upstream data with the BTS 30 via the upstream link 12. In order to maintain synchronization of the new CPE unit 40, 50, 60 with the BTS 30, the BTS 30 periodically enters into the periodic ranging procedure to periodically adjust of the TDMA timing, upstream carrier frequency and transmit power if necessary. Similarly to the initial station procedure and the station ranging procedure, three messages are also exchanged during the course of this periodic ranging procedure.

First, the BTS 30 transmits a periodic ranging opportunity message to the new CPE unit 40, 50, 60 to schedule a periodic ranging maintenance period. Upon receiving the periodic ranging opportunity message, the new CPE unit 40, 50, 60 transmits a periodic ranging request message to the BTS 30. At the BTS 30, the periodic ranging request message is used to periodically adjust the CPE local timing base, upstream carrier frequency and upstream transmit power offsets.

The adjustments are transmitted to the new CPE unit 40, 50, 60 in the form of a periodic ranging response message and applied therein to better synchronize the new CPE unit 40, 50, 60 to the BTS 30. The periodic ranging procedure is repeated periodically until the upstream link 12 fails to continuously synchronize the new CPE unit 40, 50, 60 to the BTS 30. If the upstream link 12 fails, the BTS 30 returns to the initial ranging procedure to re-synchronize the new CPE unit 40, 50, 60.

From the foregoing description, it can be observed that the R112 protocol is used to execute the ranging process and synchronize the CPE units 40, 50, 60. It will be recalled that as part of the ranging process, the signal power received at the BTS 30 for each upstream.signal is controlled with a CPE Tx transmit power control loop and the BTS receiver dynamic range is also controlled with a Rx range control loop. According to the invention, each control loop uses the R112 protocol as a means to exchange power control messages between the BTS 30 and the CPE units 40, 50, 60 for implementing both the CPE transmit control and the BTS range control. This dual power control mechanism effectively counteracts transmission impairments caused by environmental changes which may affect upstream signals transmitted by the CPE units 40, 50, 60. With this control, upstream connectivity between the BTS 30 and each CPE unit 40, 50, 60 can be more reliably maintained.

The following will now describe in detail the CPE transmit power control and BTS receiver range adjustment as implemented in the BWA TDMA network 10 and more particularly as implemented in the BTS 30 and the CPE units 40, 50, 60. The architecture and functionality necessary in each of the CPE units 40, 50, 60 is identical and, except as otherwise noted below, is only be described with reference to the CPE unit 40. It is to be understood however that this description is also equally applicable to the CPE units 50 and 60.

Figure 3:
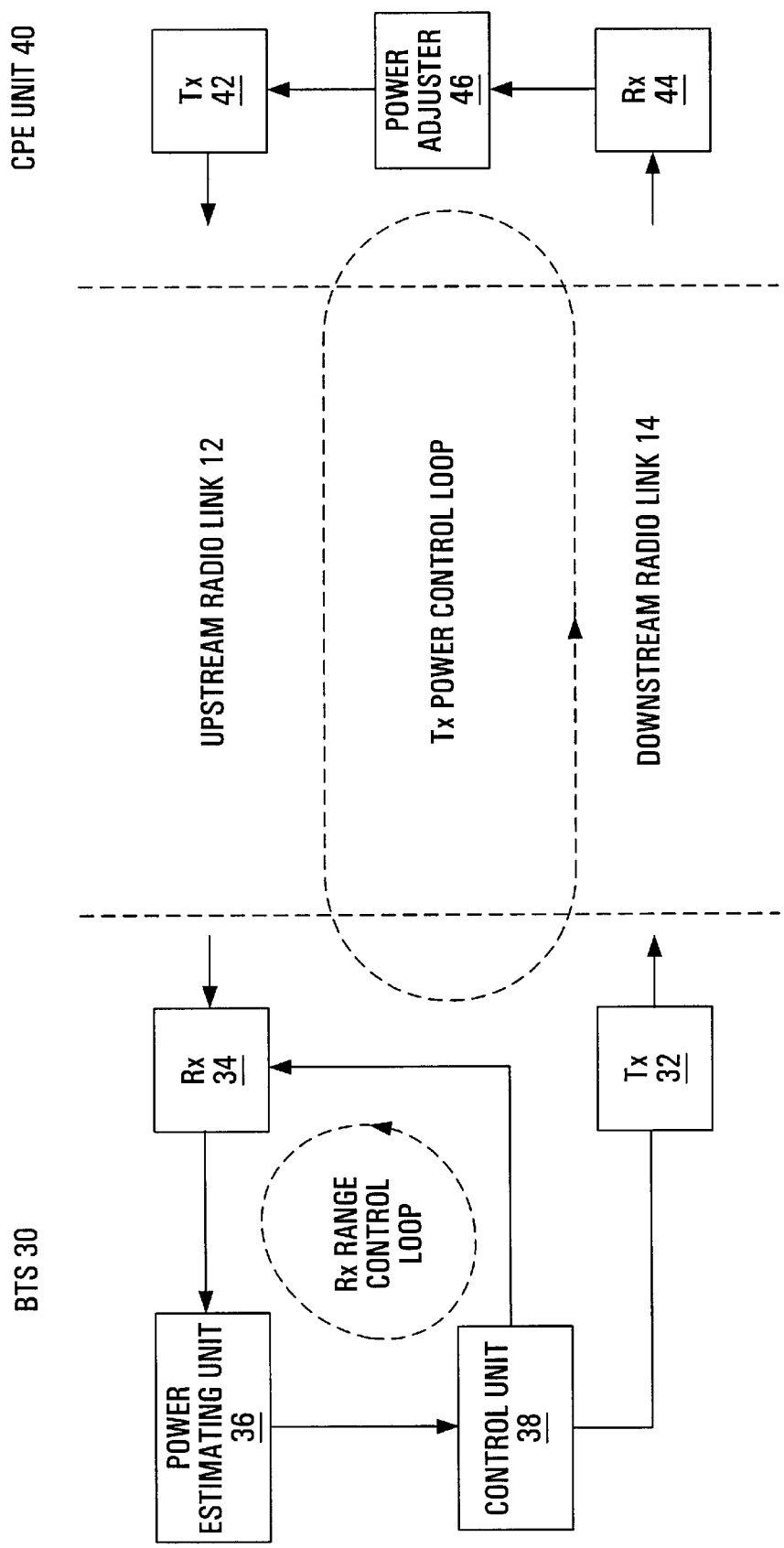
FIG. 3 is a block diagram of a CPE unit and the BTS of FIG. 1 according to a preferred embodiment of the invention.

Referring firstly to FIG. 3, there is illustrated a more detailed block diagram of the architecture and functionality necessary to implement the CPE transmit power control and the BTS receiver range control in the CPE unit 40 and the BTS 30. In order to implement this dual control mechanism, it will be recalled that two control loops are used. More specifically, a Tx power control loop is used to implement the CPE transmit power control mechanism and a Rx range control loop is used to implement the BTS receiver range control. With these two control loops, a transmit power control for the CPE unit 40 and a BTS receiver range control for the BTS 30 can be implemented to provide the necessary power control to counteract transmission impairments and ensure the reliability of the upstream connection between the BTS 30 and the CPE unit 40.

The Rx range control loop is internal to the BTS unit and is formed of the BTS receiver 34, a power estimating unit 36 and a control unit 38. More specifically, the BTS 30 has its receiver 34 internally connected to the power estimating unit 36 which is in turn connected to the control unit 38. The control unit 38 is coupled to the BTS transmitter 32 but is also connected back to the BTS receiver 34 to complete the Rx range control loop.

The Tx power control loop is formed of the same BTS components but also includes the CPE unit 40. More specifically, the Tx power control loop is formed of the BTS receiver 34, the power estimating unit 36 and the control unit 38 all connected in series with the BTS transmitter 32. At the BTS transmitter 32, the Tx power control loop extends over to the CPE unit 40 via the downstream radio link 14 to include the CPE receiver 44, a power adjusting unit 46 and the CPE transmitter 42 all connected in series. The Tx power control loop is completed with the CPE transmitter 42 connected back to the BTS receiver 34 via the upstream radio link 12.

The BTS receiver 34 receives the upstream signals transmitted from the CPE units 40, 50, 60 and operates to produce a mixed power sample sequence for the power estimating unit 36. The mixed power sample sequence contains interleaved power samples received from the CPE units 40, 50, 60. The power estimating unit 36 receives the mixed power sample sequence from the BTS receiver 34 and computes short-term and long-term power averages for each CPE unit 40, 50, 60. In the control unit 38, the short-term power averages are processed to determine whether the CPE transmit power used in each CPE unit 40, 50, 60 must be adjusted. Similarly, the long-term power averages are processed to adjust the BTS receive power window position optimally.

Figure 4:
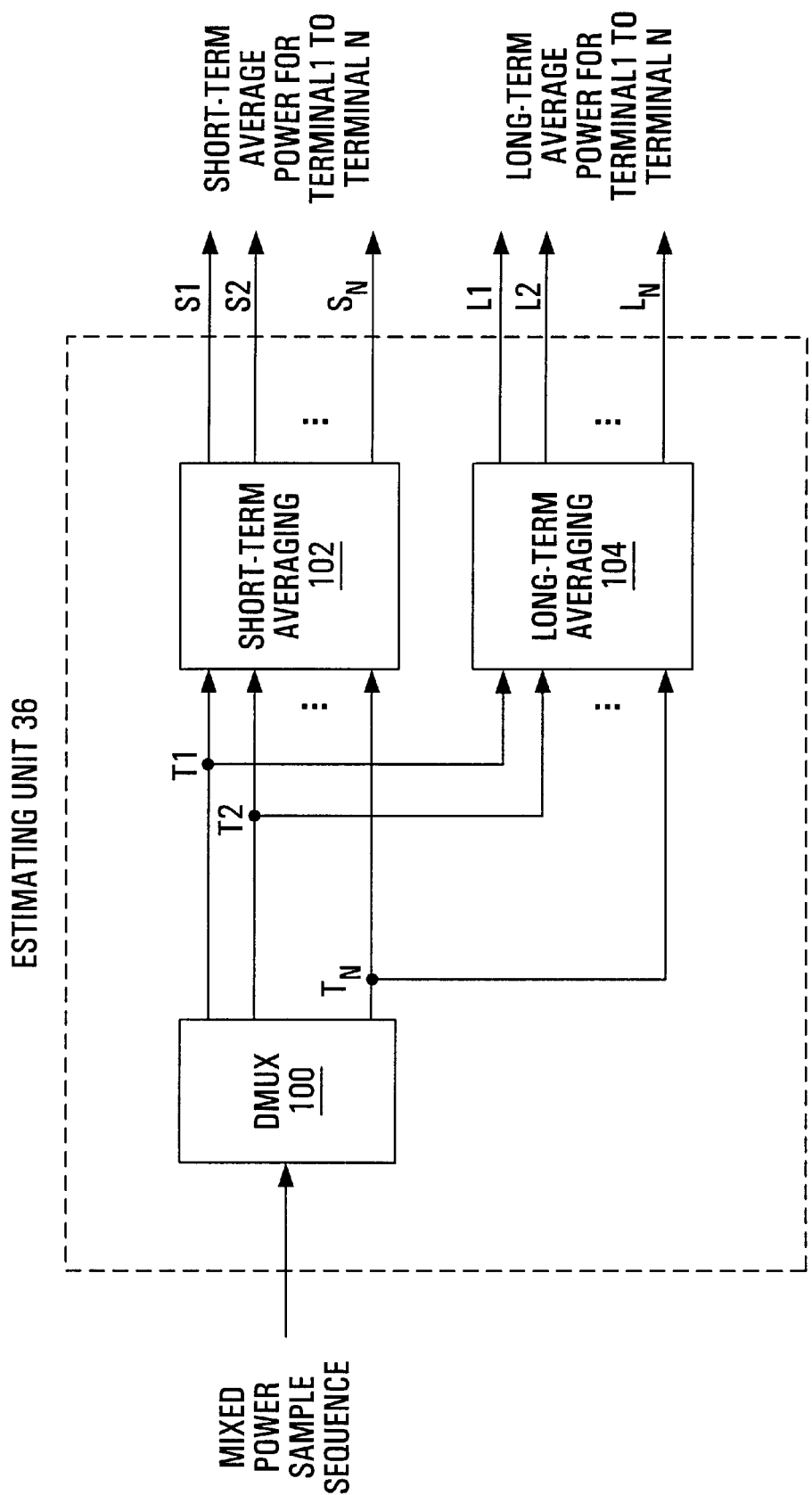
FIG. 4 is a block diagram of the power estimating unit of the BTS shown in FIG. 3.

FIG. 4 illustrates in more detail the power estimating unit 36 shown in FIG. 3. The power estimating unit 36 includes a 1:N demultiplexer 100 connected externally to the BTS receiver 34 (see FIG. 3) to receive the mixed power sample sequence. The 1:N demultiplexer 100 is connected to both a short-term averaging unit 102 and a long-term averaging unit 104 in parallel to produce thereto N power sample subsequences $T_1, _2, T_N$ each corresponding to a particular CPE unit 40, 50, 60.

Based on the N power subsequences $T_1, T_2, T_N$, the short-term averaging unit 102 produces N short-term power averages $S_1, S_2, S_N$ each corresponding to a particular CPE unit 40, 50, 60. Similarly, the long-term averaging unit 104 produces N long-term power averages $L_1, L_2, L_N$ each corresponding to a particular CPE unit 40, 50, 60.

For each CPE unit 40, 50, 60, the short-term averaging unit 102 calculates a short-term power average for a specified number of power samples received defining a short-term averaging window. For example, for a CPE unit i at the $n^{th}$ ranging period, the short-term power average $S_i(n)$ calculated by the short-term unit 102 can be expressed as follows:

$$S_i(n) = \frac{T_i(n) + T_i(n-1) + \ldots + T_i(n-K+1)}{K}$$

where $T_i(n)$ represents a power sample received from the CPE unit i at the $n^{th}$ ranging period and K is the normalized width of the short-term averaging window.

As will be explained below in further detail, the short-term power averages $S_1$, $S_2$, $S_N$ calculated for the CPE units 40, 50, 60 are used in the control unit 38 to determine a CPE transmit control power offset for each particular CPE unit 40, 50, 60.

Similarly to the short-term averaging unit 102, the long-term averaging unit 104 calculates for each CPE unit 40, 50, 60 a long-term power average for another (larger) specified number of power samples received defining a long-term averaging window. Using the same example as above, for a CPE unit i at the $n^{th}$ ranging period, the long-term power average $L_i(n)$ calculated by the long-term unit 104 can be expressed as follows:

$$L_i(n) = \frac{T_i(n) + T_i(n-1) + \ldots + T_i(n-M+1)}{M}$$

where $T_i(n)$ represents a power sample received from the CPE unit i at the $n^{th}$ ranging period and M is the normalized width of the long-term averaging window.

As will also be explained below in further detail, the long-term power averages $L_1$, $L_2$, $L_N$ calculated are forwarded to the control unit 38 to produce a power threshold for two purposes. First, the power threshold is used to determine the CPE transmit control power offsets for the CPE units 40, 50, 60. The second purpose for which the power threshold is produced is to determine an adjustment for the BTS receiver range window position.

Figure 5:
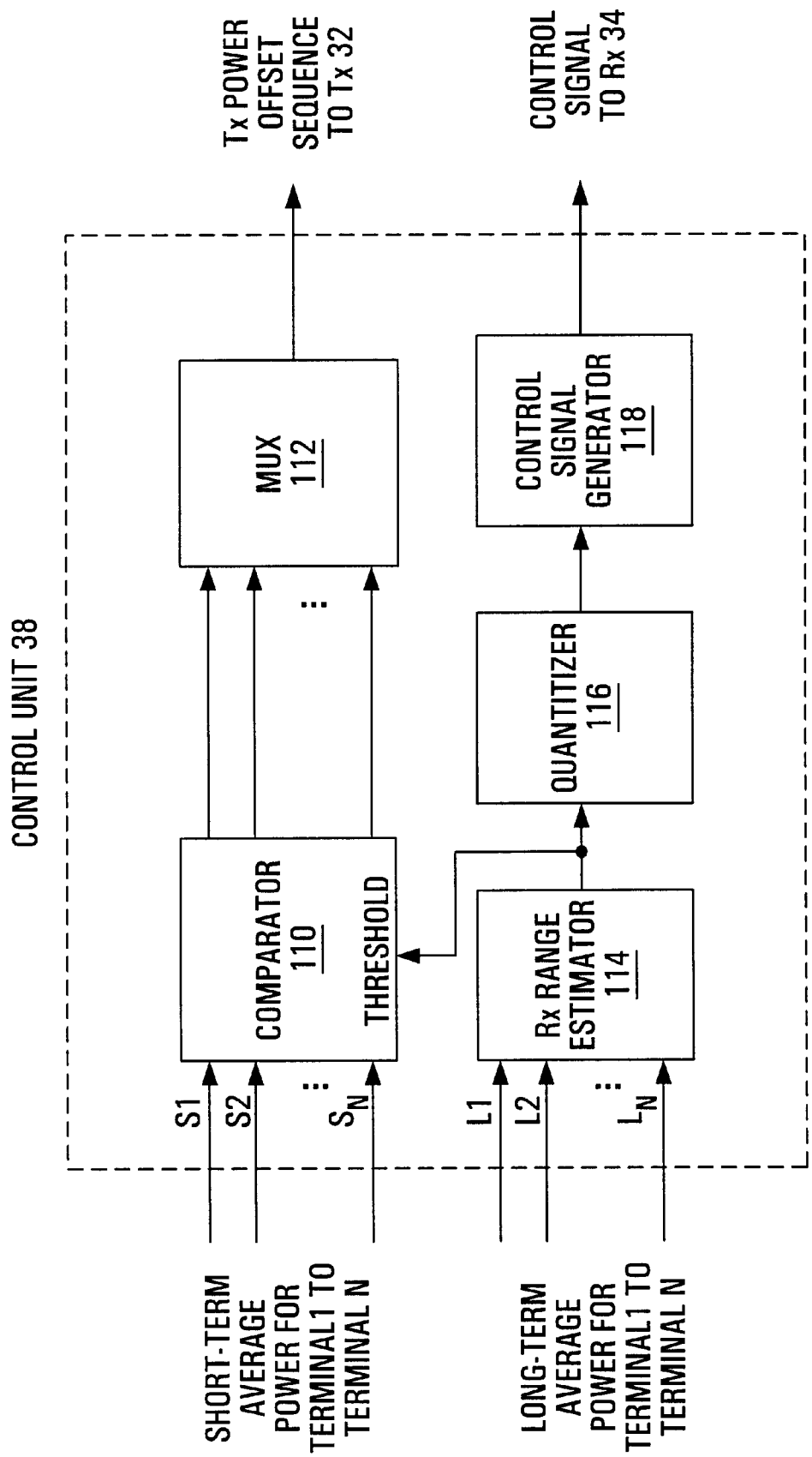
FIG. 5 is a block diagram of the control unit of the BTS shown in FIG. 3.

FIG. 5 illustrates in more detail the control unit 38 of FIG. 3. The control unit 38 has a comparator 110 connected to receive the short-term power averages $S_1$, $S_2$, $S_N$ from the estimating unit 36 to produce N CPE transmit control power offsets each for a particular CPE unit 40, 50, 60. The N CPE transmit power offsets are multiplexed by a multiplexer 112 into a Tx power offset sequence and forwarded to the BTS transmitter 32 for transmission to the CPE units 40, 50, 60 via the downstream radio link 14. The control unit also has a Rx range estimator 114 connected to receive the long-term power averages $L_1$, $L_2$, $L_N$ from the estimating unit 36 to produce a power threshold against which the short-term power average $S_1$, $S_2$, $S_N$ are compared to produce the N CPE transmit power offsets. The CPE transmit power offsets produced are then multiplexed by the multiplexer 112 into a Tx power offset sequence so that they can be transmitted to the CPE units 40, 50, 60 via the BTS transmitter 32.

The control unit 38 also has a control signal generator 118 connected to receive the power threshold produced by the Rx range estimator 114 through a quantizer 116. The control signal generator 118 produces a control signal to the BTS receiver 34 for adjusting the BTS receiver range window position.

As noted above, the short-term power averages $S_1$, $S_2$, $S_N$ calculated in the power estimating unit 36 are used in the control unit 38 to determine a CPE transmit control power offset for each particular CPE unit 40, 50, 60. For each short-term averaging window, the short-term power averages $S_1$, $S_2$, $S_N$ are each compared in the comparator 110 to the power threshold generated by Rx range estimator 114 to produce a respective CPE transmit power offset. Using again the above example of a CPE unit i at the $n^{th}$ ranging period, the comparator 110 produces a resulting power offset $\Delta P_i(n)$ which can be expressed as follows:

$$\Delta P_i(n) = S_i(n) - Ref(n)$$

where $Ref(n)$ represents the power threshold produced by the Rx range estimator 114. According to the invention, the power threshold $Ref(n)$ produced by the Rx range estimator 114 is a function of all of the long-term power averages $L_1(n)$, $L_2(n)$ $L_N(n)$ produced. For the same example as above, the power threshold $Ref(n)$ can be generally expressed as:

$$Ref(n) = f(L_1(n), L_2(n) L_N(n))$$

The power threshold $Ref(n)$ is a measure of the average power received from all of the CPE units 40, 50, 60. According to the invention, the manner in which $Ref(n)$ is calculated as a function of $L_1(n)$, $L_2(n)$ and $L_N(n)$ for determining the CPE transmit power offsets and the optimal position for the BTS receiver range window is not unique. As an example, the threshold $Ref(n)$ could be calculated with:

$$Ref(n) = f(L_1(n), L_2(n)\ L_N(n)) = \frac{L_1(n) + L_2(n) + \ldots L_N(n)}{N}$$

The above is merely an example and it is to be understood that other $f(L_1(n), L_2(n)\ L_N(n))$ expressions to calculate $Ref(n)$ could be used as long as the resulting power threshold $Ref(n)$ obtained provides a proper measure of the average signal power received from all of the CPE units 40, 50, 60.

Figure 6:
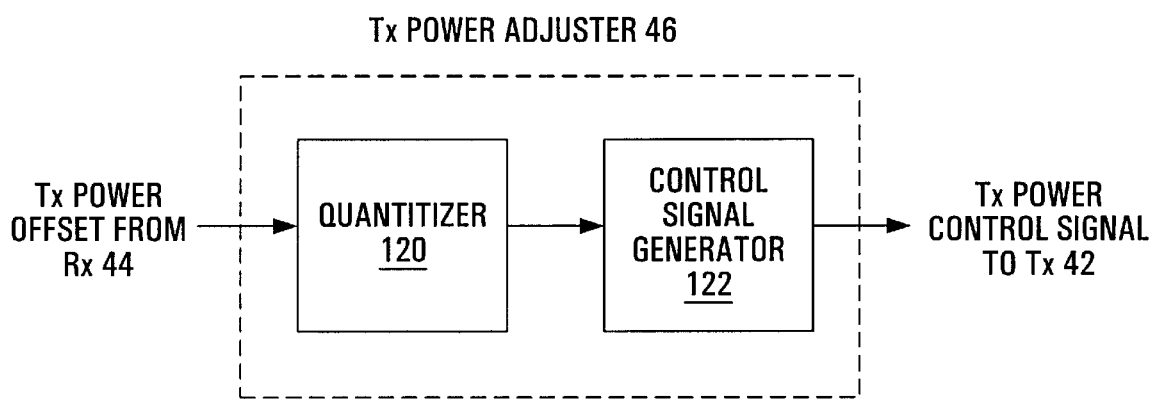
FIG. 6 is a block diagram of the power adjusting unit of the CPE unit shown in FIG. 3.

As noted above, the CPE transmit power offsets produced in the comparator 110 are multiplexed by the multiplexer 112 into a Tx power offset sequence so that they can be transmitted to the CPE units 40, 50, 60 via the BTS transmitter 32. In each CPE unit 40, 50, 60, the corresponding CPE transmit power offset is retrieved and applied therein. The architecture and functionality required in each CPE unit 40, 50, 60 to receive and apply the CPE transmit power offsets is identical and will now be described with reference to FIG. 6 only in relation to the CPE unit 40.

In order to implement a new CPE transmit power offset, the CPE unit 40 has connected between the CPE receiver 44 and the CPE transmitter 42 a quantizer 120 connected in series with a control signal generator 122. When a mixed Tx power offset sequence containing multiple CPE transmit power offsets for the CPE units 40, 50, 60 is transmitted by the BTS 30, the CPE receiver 44 operates to retrieve from the Tx sequence the CPE transmit power offset intended for the CPE unit 40. The CPE transmit power offset retrieved is quantized in the quantizer 120. Using again the above example of a CPE unit i at the $n^{th}$ ranging period, the quantizer 120 produces a resulting quantized CPE transmit offset $\Delta T_i(n)$ which can be expressed as follows:

$$\Delta Tx_i(n) = Q(\Delta P_i(n))$$

where Q( ) is a quantizing function. According to the invention, this quantized CPE transmit offset $\Delta Tx_i(n)$ can be used in the control signal generator 122 to generate the appropriate control signal for adjusting the CPE transmit power used in the CPE transmitter 42 for the next ranging period:

$$Tx_i(n+1) = Tx_i(n) + \Delta Tx_i(n)$$

Referring back to FIG. 5, the power threshold Ref(n) is also used in the control unit 38 to determine an adjustment for the BTS receiver range window position. For this, the power threshold Ref(n) is quantized in the quantizing unit 116 to produce a quantized output RW(n) which can be generally expressed as follows:

$$RW(n)=Q(Ref(n))$$

where Q( ) is another quantizing function. Based on this quantized output RW(n), the control signal generator 118 can generate the appropriate control signal for adjusting the BTS receiver range window position.

In order to implement the CPE transmit power control and BTS receiver range adjustment mechanism described above, the BTS 30 relies on the R112 protocol to obtain power samples from the CPE units 40, 50, 60 and transmit CPE transmit power offsets to the CPE units 40, 50, 60. These transactions take the form of control messages which are exchanged during the ranging process of each-CPE unit 40, 50, 60. It will be recalled that the R112 ranging process consists of an initial ranging procedure, a station ranging procedure and a periodic ranging procedure. During each ranging procedure, the BTS 30 exchanges power control messages with each CPE unit 40, 50, 60 to monitor the upstream power received from each CPE unit 40, 50, 60 and adjust the CPE transmit power and the BTS receiver power range window position accordingly.

Figure 8:
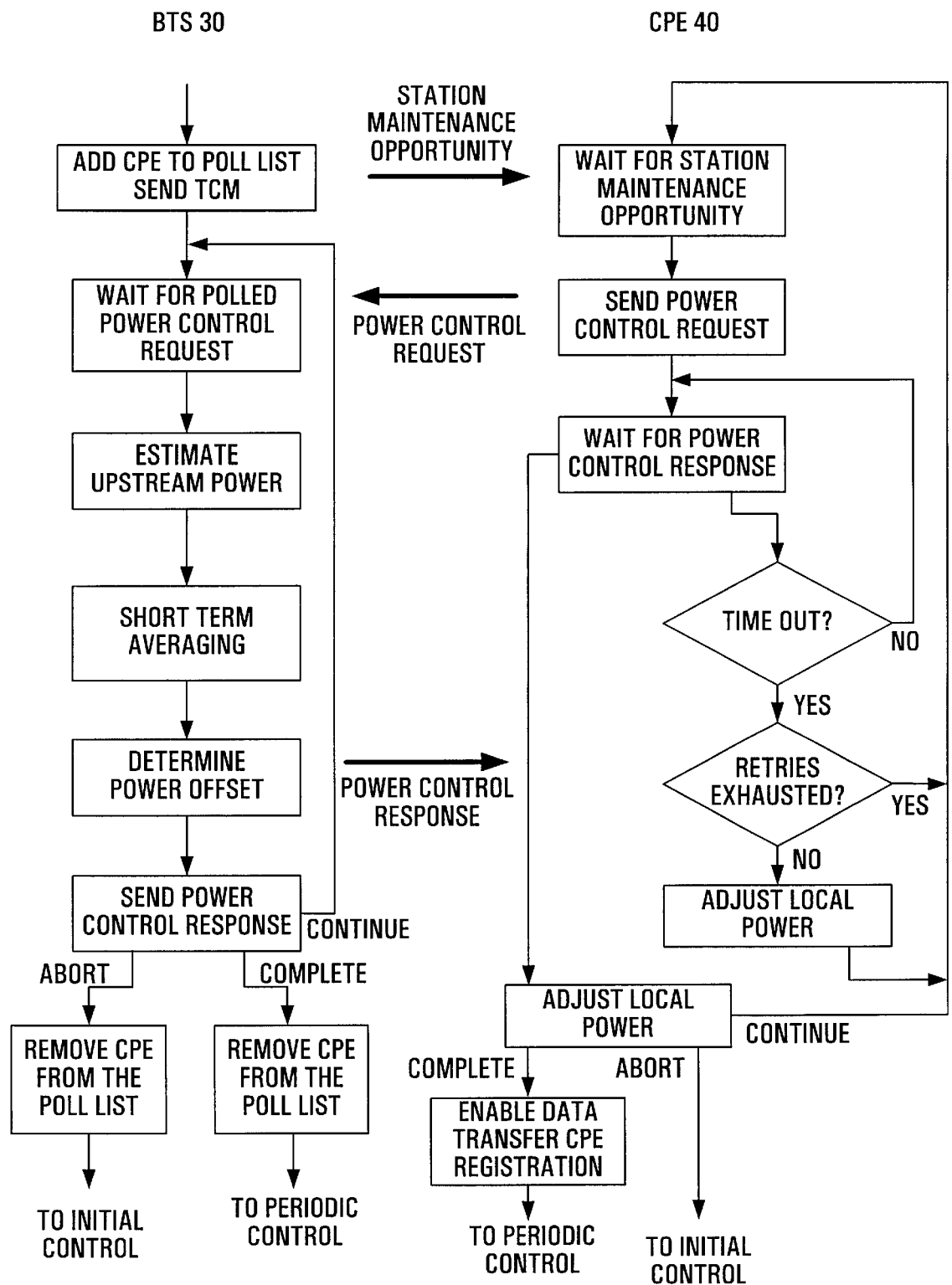
FIG. 8 is a flow chart illustrating a power control operation sequence during the R112 station ranging procedure according to the preferred embodiment of the invention.
Figure 9:
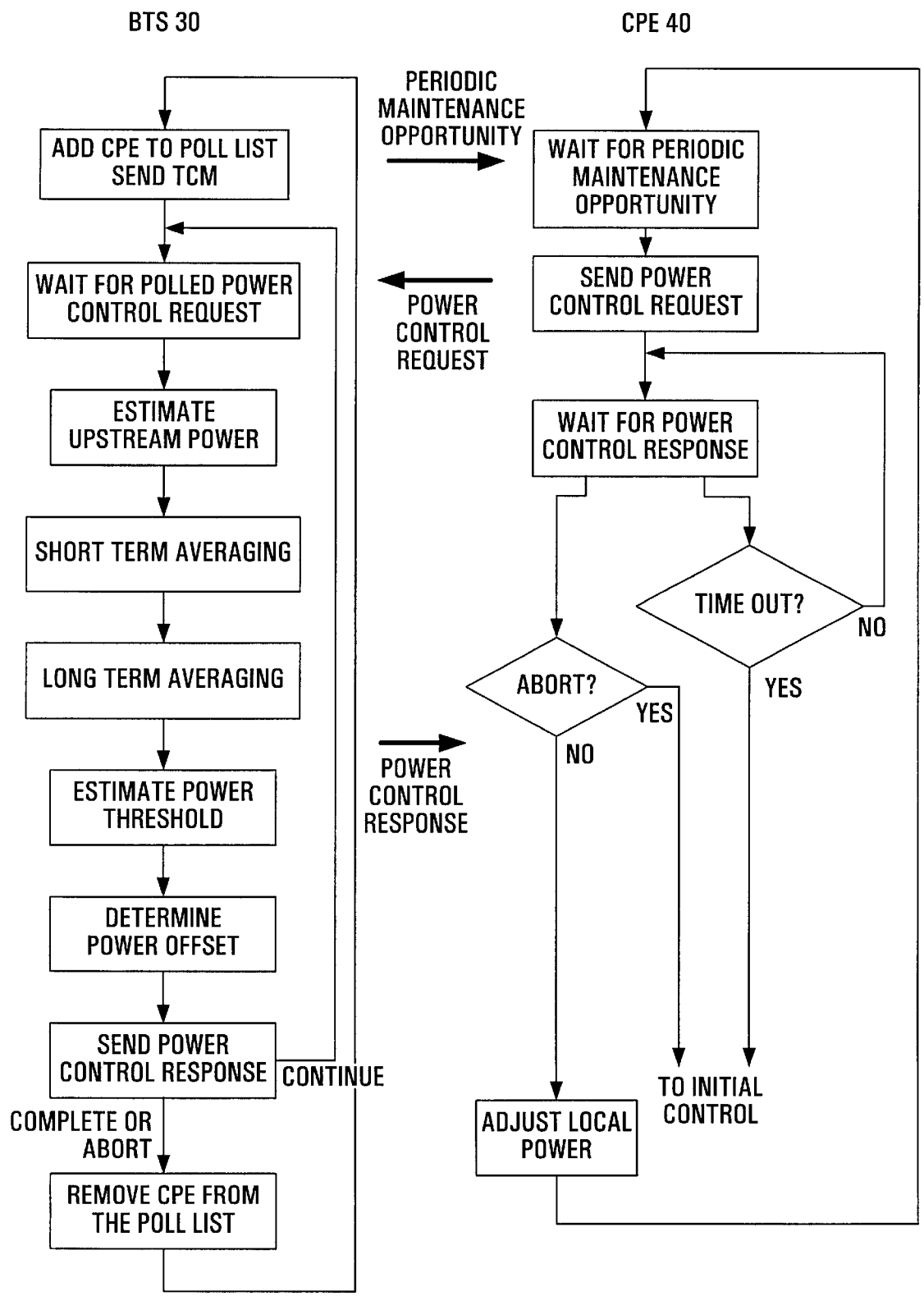
FIG. 9 is a flow chart illustrating a power control operation sequence during the R112 periodic ranging procedure according to the preferred embodiment of the invention.

The manner in which the BTS 30 communicates with each CPE unit 40, 50, 60 based on the R112 protocol to implement the CPE transmit power control and the BTS receiver range adjustment mechanism is identical and will now be described with reference to FIGS. 7, 8 and 9 only in relation to the CPE unit 40.

Figure 7:
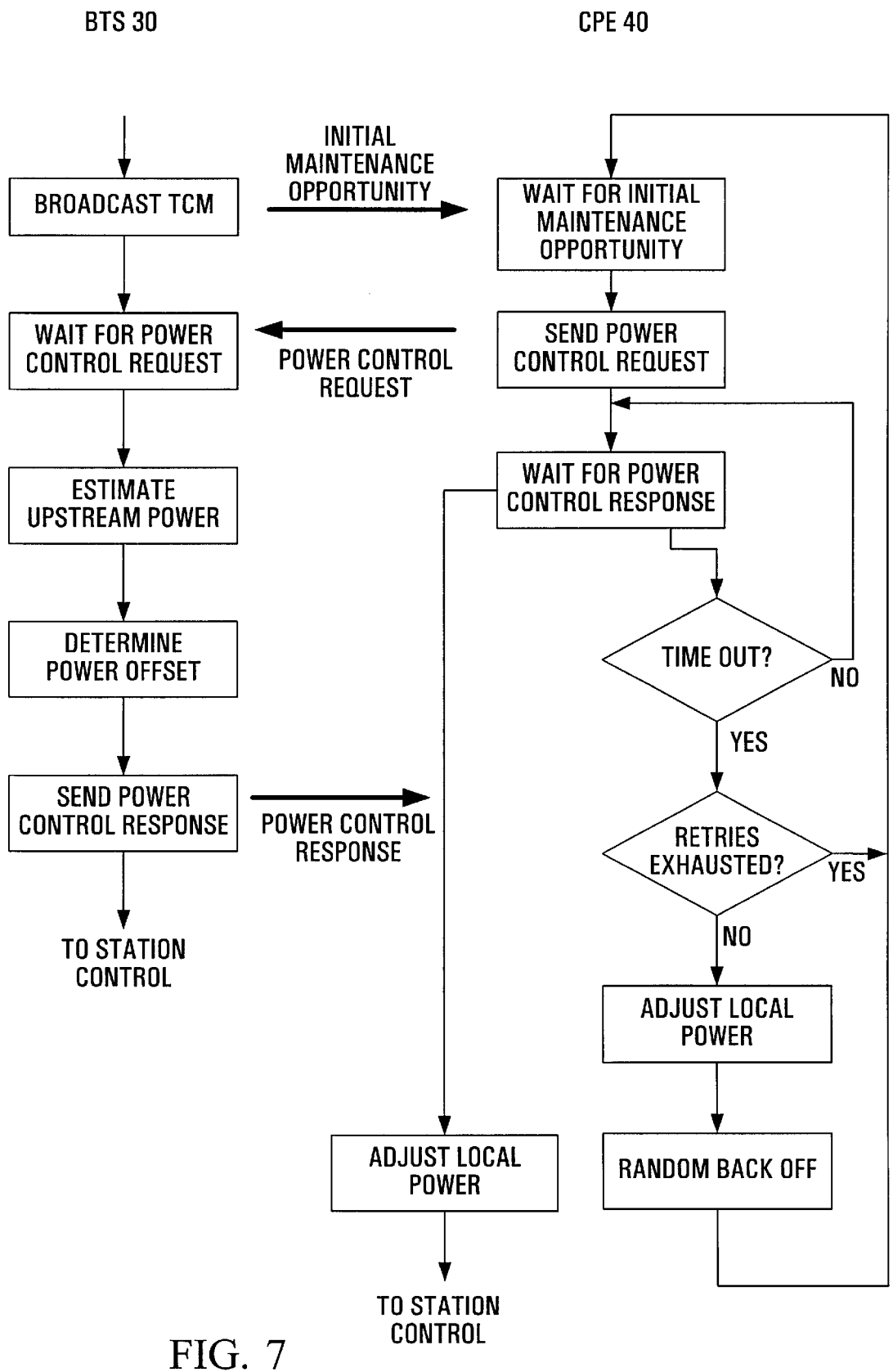
FIG. 7 is a flow chart illustrating a power control operation sequence during the R112 initial ranging procedure according to the preferred embodiment of the invention.

Referring firstly to FIG. 7, there is illustrated a flow chart of the power control operation sequence during the R112 initial ranging procedure of the CPE unit 40. During the R112 initial ranging procedure, the BTS 30 broadcasts a traffic control message (TCM) to the CPE unit 40 to schedule an initial maintenance period on the upstream radio link 12. Upon receiving this TCM message, the CPE unit 40 transmits an initial power control request message to the BTS 30. At the BTS 30, the initial power control request message is used to estimate the upstream power received and compute a nominal upstream transmit power offset for the CPE unit 40 based on the upstream power received estimate without any short-term or long term averaging. The offset calculated is then transmitted to the CPE unit 40 in the form of an initial power control response message. In the CPE unit 40, the offset received is applied in the manner described above so that the CPE transmit power can be nominally adjusted.

At this initial ranging stage, it is possible that the transmit power used by the CPE unit 40 is not adequate. As a result, the power control request message sent by the CPE unit 40 may not be received by the BTS 30 and the BTS 30 may not issue a power control response message. If the CPE unit 40 does not receive any power control response message within a specified time period, the CPE unit 40 will adjust its transmit power and wait for the next initial maintenance opportunity after a random back off time elapses to re-transmit its power control request.

After this initial station maintenance, the CPE unit 40 is in a position to nominally communicate with the BTS 30. In order to further adjust the CPE transmit power, the BTS 30 enters into the station ranging procedure. Reference is now made to FIG. 8 which illustrates the power control operation sequence during the R112 station ranging procedure for the CPE unit 40.

In the station ranging procedure, the BTS adds the CPE unit 40, 50, 60 to its station ranging poll list and sends a TCM message to the CPE unit 40 to schedule a station maintenance period. Upon receiving the TCM message, the CPE unit 40 transmits a station power control request message to the BTS 30. At the BTS 30, the station power control request message is used to estimate the upstream power received and compute another upstream transmit power offset for the CPE unit 40 based on short-term averaging of the upstream power received. The offset calculated is then transmitted to the CPE unit 40 in the form of a station power control response message. In the CPE unit 40, the offset received is applied in the manner described above so that the CPE transmit power can be finely adjusted.

According to the invention, this fine adjustment process is repeated until the upstream power received at the BTS 30 falls at an optimum point within the BTS receiver dynamic range. More specifically, the BTS 30 may continue to issue TCM messages to receive additional station power control requests from the CPE unit 40. As it receives additional requests, the BTS 30 can compute other upstream transmit power offsets for the CPE unit 40 based on further short-term averaging of the upstream power received. According to the invention, new transmit power offsets will be transmitted to the CPE unit 40 and applied therein until the upstream power transmitted can be optimally received at the BTS 30.

When the CPE transmit power control adjustment is completed, the BTS removes the CPE unit 40 from its BTS poll list and the CPE unit 40 enters a data transfer CPE registration procedure to enable upstream data transfers to the BTS 30. The CPE transmit power control procedure can also be aborted in which case the BTS 30 would revert back to the initial ranging procedure described above.

Once the transmit power used in the CPE unit 40 has been completely adjusted, the CPE unit 40 can begin to send upstream data to the BTS 30 via the upstream link 12. In order to ensure the reliability of the upstream connection between the BTS 30 and the CPE unit 40, the invention uses the R112 periodic ranging procedure to continuously monitor and adjust the CPE transmit power and the BTS receiver range window.

In the periodic ranging procedure, the BTS 30 transmits a TCM message to the CPE unit 40 to schedule a periodic ranging maintenance period. Upon receiving the TCM message, the CPE unit 40 transmits a periodic power control request message to the BTS 30. At the BTS 30, the periodic power control request message is used to estimate the upstream power received and compute an upstream transmit power offset.

The transmit power offset is calculated by first short-term averaging the upstream power received from the CPE unit 40. Next, the BTS long-term averages the upstream power received from each CPE unit 40, 50, 60 (and not just the CPE unit 40) to produce a power threshold. As previously noted the transmit power offset is calculated comparing the short-term average obtained to the power threshold. The power threshold is also used to shift the BTS receiver range window to a location where all of the upstream signals transmitted by the CPE units 40, 50, 60 can be optimally received.

The BTS receiver range window position is then shifted based on the power threshold calculated and the transmit power offset calculated is transmitted to the CPE unit 40 in the form of a periodic power control response message. In the CPE unit 40, the offset received is applied in the manner described above so that the CPE transmit power can be adjusted. When the CPE transmit power control adjustment is completed, the BTS removes the CPE unit 40 from its periodic poll list until the next periodic ranging procedure. This control adjustment procedure is repeated periodically until the upstream link 12 fails. If the upstream link 12 fails, the BTS 30 returns return back to the initial ranging procedure described above.

While the invention has been described above with reference to a particular wireless network, further modifications and improvements to implement the invention in other types of wireless networks and systems which will occur to those skilled in the art, may be made within the purview of the appended claims, without departing from the scope of the invention in its broader aspect.

In particular, the invention has been described in relation to a BWA TDMA network. It is to be understood that the invention is also applicable to other types of BWA networks. Also, the invention is not restricted to upstream transmissions from a plurality of CPE units to a BTS and could also apply to downstream transmissions from the BTS to the CPE units.

More generally, the invention is applicable to any wireless network or system in which a signal is transmitted from one station to another station provided the transmit power used for transmitting the signal and the receiving station dynamic range can be both controlled in accordance with the principles described therein.

We claim:

1. A method of providing a signal power control in a TDMA (time-division multiple access) wireless communications network for a signal transmitted from a first station set to operate at a particular transmit power to a second station having a defined receiver dynamic range, the method comprising:

receiving in the second station the signal;

sampling the received signal in the second station upon receipt of the received signal and prior to any demodulation of the received signal to produce signal power samples;

estimating in the second station a received signal power based on the signal power samples;

producing in the second station a control power signal based on the received signal power estimated;

transmitting the control power signal from the second station to the first station;

adjusting in the first station the transmit power based on the control power signal transmitted; and shifting in the second station the receiver dynamic range based on the received signal power estimated for maintaining the signal received within the receiver dynamic range.

2. The method of claim 1 wherein estimating in the second station a received signal power based on the signal power samples comprises:

short-term averaging the signal power samples to produce a short-term average of the received signal power; and long-term averaging the signal power samples to produce a long-term average of the received signal power.

3. The method of claim 2 wherein short-term averaging the signal power samples to produce a short-term average of the received signal power is done for a predetermined number of signal power samples defining a short-term averaging window.

4. The method of claim 2 wherein long-term averaging the signal power samples to produce a long-term average of the received signal power is done for a predetermined number of signal power samples defining a long-term averaging window.

5. The method of claim 2 wherein producing in the second station a control power signal based on the received signal power estimated comprises calculating in the second station a transmit power offset based on the short-term average and the long-term average of the received signal power estimated.

6. The method of claim 5 wherein adjusting in the first station the transmit power based on the control power signal transmitted comprises summing in the first station the transmit power offset with a previously calculated transmit power setting.

7. The method of claim 2 wherein shifting in the second station the receiver dynamic range based on the received signal power estimated comprises:

calculating in the second station an optimized receiver dynamic range based on the long-term average; and shifting the receiver dynamic range position to the optimized receiver dynamic range calculated.

8. The method of claim 7 wherein a first control loop formed of the first and second station is used for adjusting in the first station the transmit power based on the control power signal transmitted and wherein a second control loop internal to the second station is used for adjusting in the second station a receiver dynamic range based on the received signal power estimated.

9. The method of claim 8 wherein the second station is a base transceiver station (BTS), the first station is a customer premises equipment (CPE) unit and the signal is an upstream signal.

10. The method of claim 9 wherein the signal power control is used to counteract transmission impairments in the signal caused by environment variations.

11. The method of claim 10 wherein the signal power control is used to compensate for propagation variations in the signal caused by rainfalls.

12. The method of claim 11 wherein for adjusting in the transmitter a transmit power based on the received signal power estimated and adjusting in the receiver a receiver dynamic range based on the received signal power estimated, power control messages are exchanged between the BTS and the CPE unit based on the international telecommunications union (ITU) R112 local multipoint distribution service (LMSD) protocol (hereinafter the "R112 protocol").

13. A method of providing a signal power control in a TDMA (time-division multiple access) wireless communications network to control a plurality of signals transmitted from a plurality of first stations each operating at a particular transmit power to a second station having a defined receiver dynamic range, the method comprising:

receiving in the second station the plurality of signals;

sampling in the second station the plurality of received signals upon receipt of the plurality of received signals and prior to any demodulation of the plurality of received signals to produce a sequence of signal power samples for each of the plurality of received signals;

estimating in the second station a received signal power for each signal received based on a corresponding sequence of signal power samples;

producing in the second station a plurality of control power signals each based on the received signal power estimated for a particular signal received;

transmitting the plurality of control power signals produced from the second station to the plurality of first stations;

adjusting in each first station the transmit power based on the corresponding control power signal transmitted; and shifting in the second station a receiver dynamic range position based on the received signal power estimated for each signal to maintain the plurality of signals within the receiver dynamic range.

14. The method of claim 13 wherein estimating in the second station a received signal power for each signal received based on the sequence of signal power samples comprises:

demultiplexing the signal power samples to produce a plurality of power sample sub-sequences each representative of a particular signal received;

short-term averaging the power sample sub-sequences to produce a corresponding plurality of short-term averages each representative of the signal power received for a particular signal; and long-term averaging the power sample sub-sequences to produce a corresponding plurality of long-term averages each representative of the signal power received for a particular signal.

15. The method of claim 14 wherein producing in the second station a plurality of control power signals each based on the received signal power estimated for a particular signal received comprises for each first station calculating in the second station a respective transmit power offset based on the corresponding short-term average and long-term average of the associated received signal power estimated.

16. The method of claim 15 wherein adjusting in each first station the transmit power based on the corresponding control power signal transmitted comprises summing in each first station the corresponding transmit power offset with a previously calculated transmit power setting.

17. The method of claim 16 wherein shifting in the second station a receiver dynamic range position based on the received signal power estimated for each signal comprises:

calculating in the second station an optimized receiver dynamic range based on the plurality of long-term averages; and shifting the receiver dynamic range position to the optimized receiver dynamic range calculated.

18. The method of claim 17 wherein the second station is a base transceiver station (BTS) and each first station is a CPE unit.

19. The method of claim 18 wherein the plurality of signals is a plurality of upstream signals.

20. The method of claim 19 wherein the signal power control is used to counteract transmission impairments in each upstream signal caused by environment variations.

21. The method of claim 20 wherein the signal power control is used to compensate for propagation variations in the signal caused by rainfalls.

22. The method of claim 21 wherein for adjusting in each first station the transmit power based on the corresponding control power signal transmitted and shifting in the second station a receiver dynamic range position based on the received signal power estimated for each signal, power control messages are exchanged between the BTS and each CPE unit based on the R112 protocol.

23. A signal power control apparatus for a TDMA (time-division multiple access) wireless communications network to control a signal transmitted from a first station at a particular transmit power to a second station, the apparatus comprising at the second station:

a receiver connected to receive the signal and operable to sample the received signal upon receipt of the received signal and prior to any demodulation of the received signal to produce signal power samples;

a power estimating unit connected to the base station receiver and operable to estimate a received signal power based on the signal power samples produced;

a control unit connected to the power estimating unit and operable to produce based on the received signal power estimated a transmit power offset for the first station and a receiver dynamic range position offset for the receiver; and a transmitter for transmitting the transmit power offset to the first station in the form of a power control signal.

24. The apparatus of claim 23 wherein the power estimating unit comprises:

a short-term averaging unit operable to average the received signal power for a predetermined number of signal power samples defining a short-term averaging window for producing a short-term average of the received signal power; and a long-term averaging unit operable to average the received signal power for a predetermined number of signal power samples defining a short-term averaging window for producing a long-term average of the received signal power.

25. The apparatus of claim 24 wherein the control unit comprises:

a comparator connected to the short-term averaging unit to receive the short-term average of the received signal power, the comparator being operable to produce the transmit power offset to the transmitter for transmission to the first station;

a range estimator connected to the long-term averaging unit to receive the long-term average of the received signal power, the range estimator being operable to produce based on the long-term average of the received signal power a threshold signal;

a quantizer connected to the range estimator and operable to quantize the threshold signal for producing a quantized threshold signal; and a control signal generator connected to the quantizer and operable to produce based on the quantized signal the receiver dynamic range position offset, the control signal generator being also operable to forward the receiver dynamic range position offset to the receiver.

26. The apparatus of claim 25 wherein to produce a transmit power offset for the first station, the comparator is operable to compare the short-term average of the received signal power to the threshold signal produced by the range estimator.

27. The apparatus of claim 26 further comprising at the first station:

a first station receiver connected to receive the power control signal from the base station transmitter;

a power adjuster connected to the first station receiver and operable to generate a power offset signal based on the power control signal received; and a first station transmitter connected to the power adjuster to receive the power offset signal and operable to transmit the signal to the base station at an adjusted transmit power based on the transmit power offset.

28. The apparatus of claim 27 wherein the power adjuster comprises:

a station quantizer connected to the first station receiver and operable to quantize the power control signal for producing a quantized power control signal; and a station control signal generator connected to the quantizer and operable to produce the power offset signal based on the quantized power control signal.

29. The apparatus of claim 28 wherein the second station is a BTS and the first station is a CPE unit.

30. The apparatus of claim 29 wherein the signal power control is used to counteract transmission impairments in the signal caused by environment variations.

31. The apparatus of claim 30 wherein the signal power control is used to compensate for propagation variations in the signal caused by rainfalls.

32. A signal power control apparatus for a TDMA (time-division multiple access) wireless communications network to control a plurality of signals transmitted from a plurality of first stations each operating at a particular transmit power to a second station having a defined receiver dynamic range the apparatus comprising at the second station:

- a receiver connected to receive the plurality of signals and operable to sample the plurality of received signals upon receipt of the plurality of received signals and prior to any demodulation of the plurality of received signals to produce a sequence of signal power samples for each the plurality of received signals;
- a power estimating unit connected to the receiver and operable to estimate a received signal power for each signal based on a corresponding sequence of signal power samples;
- a control unit connected to the power estimating unit and operable to produce based on the received signal power estimated for each signal a plurality of transmit power offsets for the plurality of first stations, the control unit being also operable to produce based on the received signal power estimated for each signal a receiver dynamic range position offset for the receiver; and
- a transmitter connected to transmit each transmit power offset produced by the control unit to the corresponding first station in the form of a power control signal.

33. The apparatus of claim 32 wherein the power estimating unit comprises:

- a demultiplexer connected to receive the sequence of signal power samples from the receiver and operable to produce a plurality of power sample sub-sequences each representative of a particular signal transmitted;
- a short-term averaging unit operable to average the plurality of power sample sub-sequences for a predetermined number of signal power samples defining a long-term averaging window for producing a corresponding plurality of short-term averages of the signal power received for a each particular signal; and
- a long-term averaging unit operable to average the plurality of power sample sub-sequences for a predetermined number of signal power samples defining a long-term averaging window for producing a corresponding plurality of long-term averages of the signal power received for each particular signal.

34. The apparatus of claim 33 wherein the control unit comprises:

- a comparator operable to receive the plurality of short-term averages to produce the plurality of transmit power offsets;
- a multiplexer connected to the comparator and operable to multiplex the plurality of transmit power offsets into a power offset sequence, the multiplexer being also operable to forward the power offset sequence to the transmitter for transmission to the plurality of first stations;
- a range estimator operable to receive the long-term averages to produce a threshold signal;
- a quantizer connected to the range estimator and operable to quantize the threshold signal for producing a quantized threshold signal; and
- a control signal generator connected to the quantizer and operable to produce based on the quantized signal the receiver dynamic range position offset, the control signal generator being also operable to forward the receiver dynamic range position offset to the receiver.

35. The apparatus of claim 34 wherein to produce each transmit power offset, the comparator is operable to compare the corresponding short-term average to the threshold signal produced by the range estimator.

36. The apparatus of claim 35 further comprising at each first station:

- a first station receiver connected to receive a respective power control signal from the second station transmitter;
- a power adjuster connected to the first station receiver and operable to generate a power offset signal based on the power control signal received; and
- a first station transmitter connected to the power adjuster to receive the power offset signal and operable to transmit a respective signal to the second station at an adjusted transmit power.

37. The apparatus of claim 36 wherein the second station is a BTS and each first station is a CPE unit.

38. The apparatus of claim 37 wherein the signal power control is used to counteract transmission impairments in each signal which are caused by environment variations.

39. The apparatus of claim 38 wherein the signal power control is used to compensate for propagation variations in each signal which are caused by rainfalls.

* * * * *

UNITED STATES PATENT AND TRADEMARK OFFICE
CERTIFICATE OF CORRECTION

PATENT NO.    : 6,519,449 B1
DATED         : February 11, 2003
INVENTOR(S)   : Genzao G. Zhang et al.

It is certified that error appears in the above-identified patent and that said Letters Patent is hereby corrected as shown below:

<u>Column 8,</u>
Line 39, add -- It should be apparent that for a TDMA network each of the upstream signals transmitted from a CPE unit is distinguishable from the signals transmitted from another CPE unit before demodulation. The receiver produces the mixed power sample sequence by directly sampling the plurality of received signals. In other words, the sampling is done prior to any demodulation. -- between "...50, 60." and "The power estimating...." -as amended in the response dated August 29, 2002.

Signed and Sealed this

Second Day of September, 2003

JAMES E. ROGAN
*Director of the United States Patent and Trademark Office*